Aug. 1, 1967  W. E. HARVEY  3,333,418
REMOTE CONTROL DEVICE
Filed June 10, 1965  2 Sheets-Sheet 2
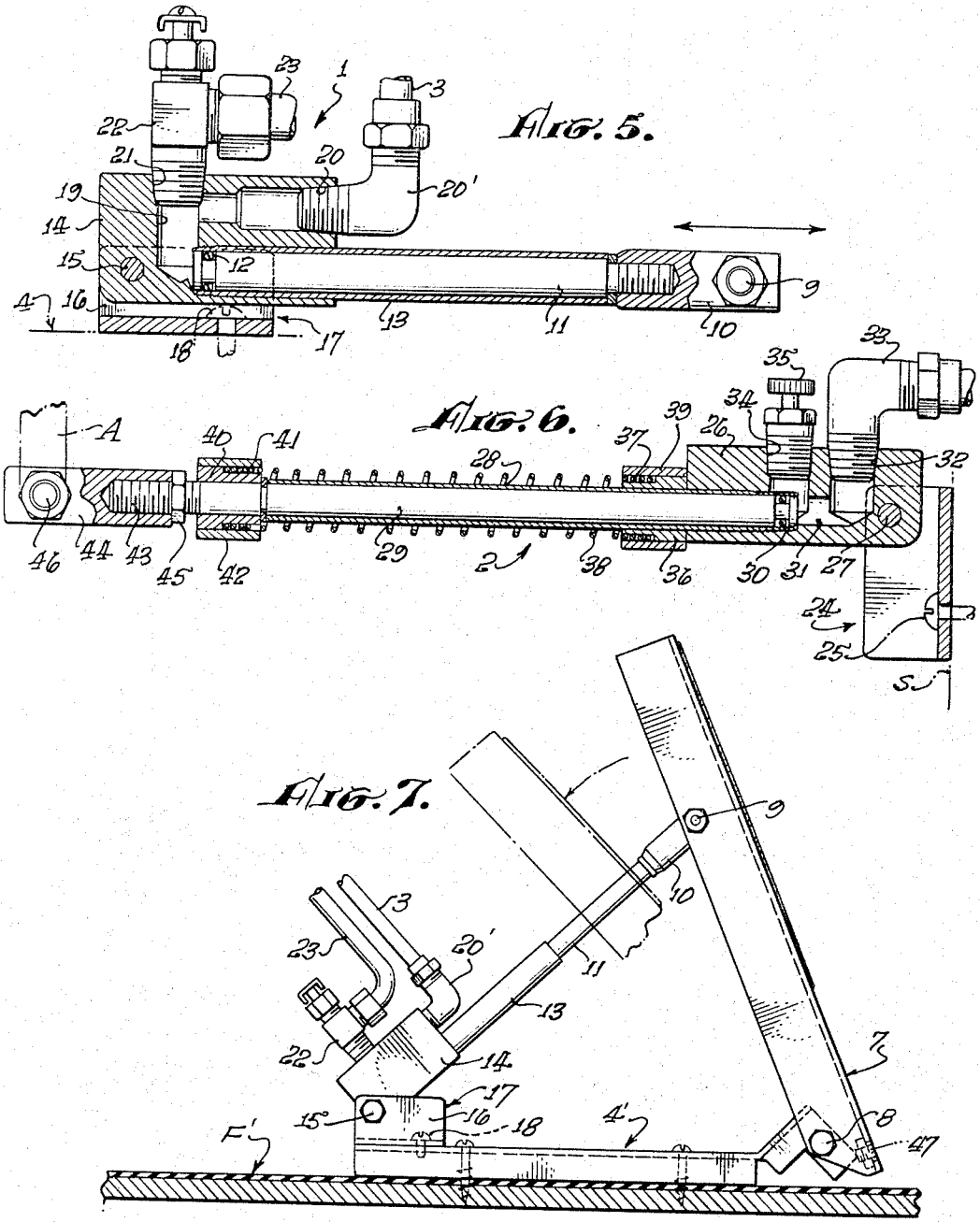
INVENTOR
WILLIAM E. HARVEY,
By Harold J. LeVesconte
ATTORNEY.

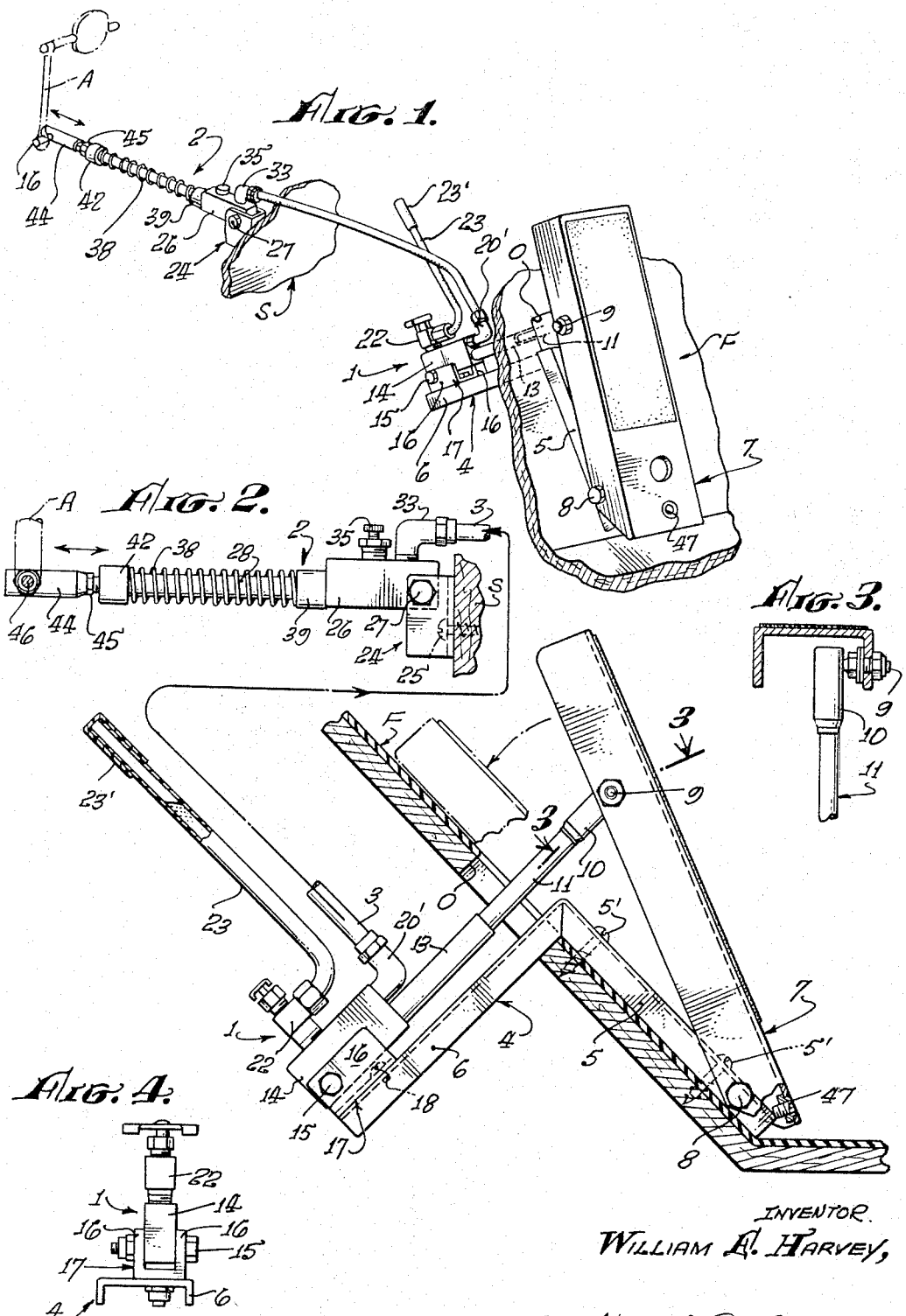

United States Patent Office

3,333,418
Patented Aug. 1, 1967

3,333,418
REMOTE CONTROL DEVICE
William E. Harvey, 8667 Le Berthon St.,
Sunland, Calif. 91040
Filed June 10, 1965, Ser. No. 462,832
2 Claims. (Cl. 60—54.5)

This invention relates to manual control devices and more particularly to a form thereof which, among other fields of usage is well adapted for use as a throttle control for internal-combustion engines and primarily those used in motor vehicles and boats and which are customarily controlled by foot pedal means at a point remote from the engine. To effect a mechanical linkage between the throttle valve of the carburetor and a foot pedal often involves a complicated assembly of links and levers and in which play may develop or actual breakage may occur.

Among the principal objectives of the present invention are: the provision of a throttle control means comprising a hydraulic linkage including a pedal-operated master cylinder and piston connected by a fluid line to a slave cylinder and piston which in turn, is operatively connected to the element to be operated, e.g., a throttle valve; in which the slave cylinder and piston is of a different diameter than the master cylinder and piston to effect a leverage effect in the ratio of longitudinal travel; in which an incorporated opposing spring means is employed of a character imparting substantially uniform resistance throughout the range of movement; and in which the maximum extent of travel which may be imparted to the slave cylinder unit by the master cylinder unit may be varied.

With the foregoing objects in view, together with such additional objects and advantages as may subsequently appear, the invention resides in the parts and in the construction, combination and arrangement of parts described, by way of example, in the following specification of certain presently preferred embodiments of the invention, reference being had to the accompanying drawings which form a part of said specification and in which drawings:

FIG. 1 is a small scale perspective view of a device constituting a first embodiment of the invention, FIG. 2 is a side elevational view of the first embodiment, the connecting conduit being broken away and the master and slave units being closely associated to conserve drawing space, FIG. 3 is a fragmentary, sectional view taken on the line 3—3 of FIG. 2 to show the connection of the master cylinder piston to the foot pedal, FIG. 4 is an end elevational view of the master cylinder head end as viewed in the direction of the arrowed line 4—4 on FIG. 2, FIG. 5 is an enlarged longitudinal medial sectional view of the master cylinder unit, FIG. 6 is an enlarged scale, medial longitudinal sectional view of the slave cylinder unit, and FIG. 7 is a side elevational view of a modified form of the master cylinder unit for use on a horizontal floor surface.

Referring first to FIGS. 1-6, the first embodiment comprises a master cylinder and piston unit 1 connected to a slave piston and cylinder unit 2 by a flexible conduit means 3. The master unit 1 is shown as adapted for mounting on an upwardly and forwardly inclined floor board F, as in an automobile, and includes a base 4 here shown as being formed of shallow inverted channel metal stock having a run 5 secured to the floorboard F by screws 5' and having a run 6 disposed at right angles to the run 5 and projecting downwardly and forwardly through an opening O in the floorboard. This base is shown as having been formed from a length of rolled or extruded metal bar having the side flanges notched and then being bent at the apex of the notch into the right angle form shown but obviously this element could be made in any manner which produced the desired strength and configuration. The free end of the run 5 is straddled by the depending side flanges of the lower end of a foot pedal 7 which is also formed of channel metal, said pedal being pivotally connected to the end of the run 5 by a pivot bolt 8. At a point beyond the end in the base member 4, one flange of the foot pedal carries a bolt 9 having a head which is pivotally connected to the upper end 10 of the master piston rod 11, said piston rod extending therefrom through the opening O and having its other end provided with an O-ring 12 slidingly engaging the interior of the master cylinder 13. The opposite end of the cylinder 13 is secured to and closed by a head block 14 which is pivotally mounted by a bolt 15 between the flanges 16, 16 of a yoke member 17 secured to the forward face of the distal end of the run 6 of the base member 4 by a screw 18, the bolt 15 being disposed parallel to the bolt 8. The head 10 of the master piston (see FIG. 5) by engaging the end of the cylinder 13 serves as a stop to limit the extent of inward movement of the piston rod 11.

The head block 14 includes a fluid passage 19 communicating at one end with the cylinder 13 and at its other end with a first threaded fluid port 20 adapted to be connected by a coupling 20' to one end of the flexible conduit means 3, the other end of said conduit means being connected to the appropriate port of the slave unit 2 as will be presently described in detail. The passage 19 is also connected to a second port 21 carrying a manually operable valve 22 through which fluid may be supplied to the unit through a short transparent conduit 23 having the distal end thereof closed by a friction cap 23' and constituting a reservoir for purposes to be presently described.

The slave unit 2 includes a bifurcated base element 24 adapted to be secured by suitable means, such as a screw 25, to a suitable support S attached to the engine or other convenient fixed location adjacent to the throttle operating means and between the spaced flanges of said base element. The head block 26 of the slave cylinder is pivotally secured to the base element 24 by a pivot bolt 27 with the slave cylinder 28 carried thereby extending from said head block toward the point of attachment of the slave piston 29 which is reciprocable therein, to the throttle valve operating arm A (see FIG. 1); said piston carrying an O-ring 30 at its inner end. The head block 26 is provided with a fluid passage 31 extending between the inner end of the cylinder 28 and the port 32 adapted to be connected by a fitting 33 to the other end of the flexible conduit means 3 which extends from the port 20 of the master unit 1. A second port 34 in the head block connects the passage 31 with an air bleed valve 35.

Secured to the exterior of the slave cylinder 28 adjacent to the head block 26 is a collar 36 having a reduced diameter end portion 37 provided with a coarse, shallow, helical groove engaged by one end of a closely wound tension spring 38 which surrounds and substantially covers the length of the body of the cylinder 28. A sleeve element 39 closely fits over the collar 36 and the exterior of the portion of the spring which engages the collar portion 37 to secure the end of the spring to the collar 36 by confining the engaged convolutions of the spring in the groove. The portion of the slave piston 29 which projects beyond the cylinder 28 when the piston is almost bottomed against the head block (see FIG. 6) carries a collar 40 mounted thereon, said collar at the end thereof adjacent the cylinder having a reduced diameter, helically grooved portion 41 over which the opposite end of the spring 38 is engaged, the length of the spring being such as to be under sufficient initial tension when so engaged to maintain the device. A surrounding sleeve 42 secures the spring 38 to the collar 40 in the same manner as does the sleeve element 39. The reduced diameter end of the collar 40 serves additionally as a stop member for limiting the extent of travel of the piston 29 into the cylinder 28. The end of the piston 29 adjacent the collar 40 is exteriorly threaded as at 43 and carries a connector member 44 secured in longitudinal adjustment thereon by a lock nut 45, said connector member having appropriate means for connection to the throttle valve operating arm A or the like as, for example, the bolt and nut 46.

Attention is especially directed to the novel features of the return spring 38. The most common practice for spring return means for slave cylinder pistons is the use of compression springs within the cylinder. Compression springs have a characteristic of a rapidly increasing rate as they are compressed and thus impose a non-uniform resistance to movement tending to compress them. In contrast, in the present invention, a close wound tension spring is employed which is of substantially the same length as the cylinder which thus offers a substantially uniform resistance throughout the range of movement of the slave piston. By mounting it on the exterior of the slave cylinder, the cylinder serves as a guard to prevent the spring from accidental lateral distortion, and by thus mounting the spring on the apparatus, there is no necessity for finding an anchorage point for one end of the spring.

The form of master unit shown in FIG. 7 is particularly adapted for installations on a flat floor F′ as commonly found in boats. The only difference is the form of the base member 4′ to accommodate the difference in floor location. Accordingly, other than the base 4′ and floor F′, all other parts are identical with the first described embodiment and have been given the same numbers.

This mechanism, when employed for throttle control, has the advantage that it can be installed between the throttle and foot pedal regardless of the distance between them or the presence of intervening mechanism. Assuming that the system is filled with hydraulic fluid, depressing the foot pedal with resultant inward movement of the master piston will cause outward movement of the slave piston against the bias of the return spring 38. Upon releasing pressure against the foot pedal, the spring will return the slave piston to its innermost position with simultaneous outward movement of the master piston. Due to the fact that, in the illustrated embodiment, the slave cylinder and piston are of less diameter than the master cylinder and piston, a given movement of the master piston effects a greater lineal movement of the slave piston. In the illustrated embodiment, this ratio is approximately 1½:1 but the ratio may be such as is suited to the particular use by the selection of appropriate diameters of master and slave cylinders and pistons. The connecting conduit is sufficiently flexible to accommodate the angular displacement of the units about their pivotal mountings incident to the connection of the piston to pivotally mounted members, wherefore, alignment problems are not involved in installation. The close wound, initially tensioned spring 38 affords substantially uniform resistance to pedal movement through the maximum range of movement of the device and, as mounted, forms an integral part of the device thus eliminating any need of selecting and anchoring means for one end of the spring to some point on the vehicle or boat.

There remains for description the use of the reservoir 23. The capacity of this reservoir is at least equal to the difference in volume of the operating fluid body at the maximum and minimum working stroke for which it may be adjusted. When the device is initially installed, it is filled with hydraulic fluid through the tube 23 and all air is expelled until a point is reached at which the system is completely filled with the slave cylinder and piston in the position shown in FIG. 6 and the master cylinder moved outwardly to a point of maximum outward movement determined by the adjustment of the stop screw 47 at the lower end of the foot pedal 8 as that screw engages the base member 1 as shown in FIG. 2. At this adjustment, the reservoir tube should be not quite empty. Downward movement of the foot pedal will, of course, project the slave piston outwardly proportionately. If a shorter length of travel of the slave cylinder should be desired, this is accomplished by reducing the amount of fluid in the system. To effect this, the valve 22 is opened and the pedal is depressed with resultant expulsion of the desired amount of fluid into the reservoir and while it is held in the selected depressed position, the reservoir valve 22 is closed. Thereafter, movement of the foot pedal to its downward limit will effect a lesser extent of outward movement of the slave piston. The stop screw 47 is then adjusted until it touches the base member 4 and the device is thus ready for use with the lesser extent of travel both of the foot pedal and of the slave piston.

The apparatus has many uses. Among such uses may be the replacement of linkage trains in any place where long complicated trains are employed or where a standard linkage is not available. It is useful to those building and modifying motor vehicles such as racers, hot rods and the like. Other uses are those in which the engine is remote from the point of control as for example, buses in which the engine is at the rear or beneath the bus body, all rear engine vehicles, boats, special vehicles and apparatus such as cranes or derricks and particularly those mounted on motor vehicles and having the crane or lift operating engine disposed at a distance from the operating cab or seat. Installation is simple since the master and slave units are not dependent on one another for alignment considerations and in each unit, the piston and cylinder are self-aligning as a unit with the mechanism elements to which the pistons are connected.

With all of the foregoing considerations in mind, it will be appreciated that while in the foregoing specification there has been disclosed certain presently preferred embodiments of the invention, such disclosure has been by way of example, wherefore, the invention shall not be deemed to be limited to the specific embodiments thus disclosed and that, the invention includes, as well, all such modifications in the parts, and in the construction, combination and arrangement of parts as shall come within the purview of the appended claims.

I claim:

1. In a remote control device for transmitting reciprocating motion, manually operable master piston and cylinder component, a slave cylinder and piston component, hydraulic means including a conduit means interconnecting the cylinders of said components and a body of fluid in said cylinders and conduit means operative to transmit input movements of the piston of one of said components into complementary movement of the piston of the other component, spring means normally operative to maintain said components at a predetermined position, and means operable to increase or decrease the volume of said body of fluid with resultant increase or decrease in the maximum possible length of stroke of the pistons in their respective cylinders, said means operable to increase or decrease the volume of said fluid body including a fluid reservoir mounted on said master component and connected to said body of fluid by a fluid passage, and a manually operable, normally closed valve interposed in said fluid passage, said reservoir having a capacity at least equal to the difference between a permissible maximum and minimum volume of said fluid body.

2. A throttle control means for the engines of motor vehicles, boats and the like wherein the engine is located at a point remote from the operator of the vehicle, boat or the like, said control means comprising a master cylinder having a closed end pivotally mounted on a support, a master piston reciprocable in said cylinder and projecting from the end thereof opposite the pivotally mounted end thereof, a foot pedal operatively connected to said master piston for effecting movement thereof into said master cylinder, a slave cylinder having a closed end pivotally mounted on a support, a slave piston reciprocable therein and projecting from the end thereof remote from said pivoted end, fluid conduit means interconnecting the interiors of the closed ends of said cylinders, a body of fluid contained in said cylinders and fluid conduit means, spring means normally urging said master and slave pistons toward a predetermined limit of movement thereof opposite the direction of movement initiated by said foot pedal, and means, including a body of fluid contained in a fluid reservoir adapted optionally to be placed in communication with said body of fluid for optional increase or decrease of the total volume of fluid in said cylinders and conduit means with resultant variation in the possible maximum extend of movement of said pistons, said reservoir being mounted at said closed end of said master cylinder and being connected with the interior of the closed end of said master cylinder by a fluid passage means and a manually operable, normally closed valve being disposed in said fluid passage to permit or prevent the flow of fluid in either direction between said reservoir and said cylinder.

References Cited
UNITED STATES PATENTS

| | | | |
|---|---|---|---|
| 1,606,224 | 11/1926 | Hoeller | 60—54.5 X |
| 1,802,790 | 4/1931 | Squires | 60—54.5 X |
| 2,135,011 | 11/1938 | McGauchie | 60—54.5 |
| 3,044,267 | 7/1962 | Hicks | 60—54.5 |
| 3,123,061 | 3/1964 | Budroni | 60—54.5 X |

FOREIGN PATENTS

| | | |
|---|---|---|
| 77,121 | 7/1950 | Norway. |

MARTIN P. SCHWADRON, *Primary Examiner.*

ROBERT R. BUNEVICH, *Examiner.*